United States Patent [19]

Cummins

[11] Patent Number: 4,948,611

[45] Date of Patent: Aug. 14, 1990

[54] METHOD FOR DIVIDING AND CUTTING DOUGH AND THE LIKE

[75] Inventor: Donald L. Cummins, Mechanicsville, Va.

[73] Assignee: Automated Machinery Systems, Inc., Richmond, Va.

[21] Appl. No.: 367,618

[22] Filed: Jun. 19, 1989

[51] Int. Cl.⁵ ................................................ A21D 6/00
[52] U.S. Cl. ...................................... 426/503; 426/516; 426/518
[58] Field of Search ...................... 426/503, 516, 518; 425/202, 308, 311; 83/580, 604

[56] References Cited

U.S. PATENT DOCUMENTS

| | | | |
|---|---|---|---|
| 2,858,775 | 11/1958 | Marasso | 425/241 |
| 3,941,538 | 3/1976 | Orlowski | 425/311 |
| 4,332,538 | 6/1982 | Campbell | 425/311 |
| 4,424,236 | 1/1984 | Campbell | 426/518 |
| 4,449,908 | 5/1984 | Campbell | 425/204 |
| 4,517,212 | 5/1985 | Campbell | 426/503 |
| 4,786,517 | 11/1988 | Pinto | 426/516 |

*Primary Examiner*—George Yeung
*Attorney, Agent, or Firm*—Staas & Halsey

[57] ABSTRACT

An apparatus and method for dividing a mass of dough into a plurality of individual streams by means of a manifold and fine tuning the flow rate of the individual streams by weir type diaphragm valves so the streams have identical flow rates. Each of the individual streams of dough are simultaneously cut into identical dough pieces by a rotating driver by a four-bar link mechanism.

10 Claims, 4 Drawing Sheets

METHOD FOR DIVIDING AND CUTTING DOUGH AND THE LIKE

This invention relates to an apparatus and method for dividing a continuous stream of dough and the like into multiple continuous streams which are simultaneously extruded and cut-off by a unique cutting mechanism to provide pieces to be baked into buns, rolls and the like having predetermined weights of uniform density and texture. The apparatus and method may also be used for other materials that are similar to dough and its characteristics.

The invention is an improvement on the apparatus and methods disclosed in U.S. Pat. Nos. 4,332,538, 4,424,236, 4,449,908 and 4,517,212 which are referred to herein and incorporated by reference. These prior patents show a double auger type of dough pump and divider which takes a mass of dough in bulk form and pumps it through in a single extruder or dispensing nozzle where it is cut into uniform pieces by a cutter moving across the dispensing nozzle.

The present improvement utilizes the prior art apparatus by dividing the continuous stream of dough and the like into smaller volumes which are simultaneously cut-off by a knife preset to a constant cut-off rate. A very important criteria for a successful machine and method for producing dough pieces in large quantities is to provide pieces which are uniform in weight for subsequent handling and baking.

The invention also includes a unique cutting mechanism which may also be utilized with single discharge ports.

The invention preferably utilizes the improved apparatus and method for pumping and homogenizing dough as described more fully in U.S. patent application entitled "Apparatus and Method for Pumping, Homogenizing and Dividing Dough and the Like" of Donald L. Cummins, assigned to the assignee and filed on even date herewith. This other patent application is also an improvement to the four U.S. patents listed above and the patent application is referred to and incorporated by reference herein.

The present invention utilizes a manifold for dividing the continuous stream of dough into multiple streams and the flow rate is fine tuned by a throttling valve so that each of the multiple streams of dough flow at a constant rate to a cut-off section at each of the discharge ports. The valves are preferably the weir type of diaphragm sanitary valves which utilize a polytetrafluoroethylene (TFE) coated diaphragms. These valves control the velocities of the dough to the multiple discharge ports at the cut-off section and provide a relatively straight line adjustment control so that the amount of movement of the valve adjustment means causes a similar relative amount of throttling. The valves used are available from several sources but one of the preferred types of valves are the Saunders weir type diaphragm valves produced by the Saunders Valve, Inc., 15760 West Hardy Road, Houston, Tex. 77060.

The cut-off mechanism utilizes a plastic cut-off knife mounted on a four-bar link mechanism which is driven by a continuous predetermined constant speed drive shaft which provides a (1) straight line motion; (2) velocity change; (3) path change; and (4) product control as the four-bar link mechanism goes through a complete cycle. The invention is of special value in producing hamburger buns in large quantities as the pieces cut-off are of uniform texture and weight with the tolerances on the weight of the pieces being within $\frac{1}{2}$% as opposed to more normal tolerances of $2\frac{1}{2}$% variations in weight. Since no lubricating oil is utilized, except for the first run which is wiped off immediately by the first dough passing through the apparatus, the buns can be produced with a uniform color. The tight tolerances of the finished pieces greatly improve the subsequent automatically handling of the pieces for the baking operation and packaging.

The features of the present invention will become more apparent upon reading the following specification, when taken in conjunction with the accompanying drawings in which.

Figure 1A:
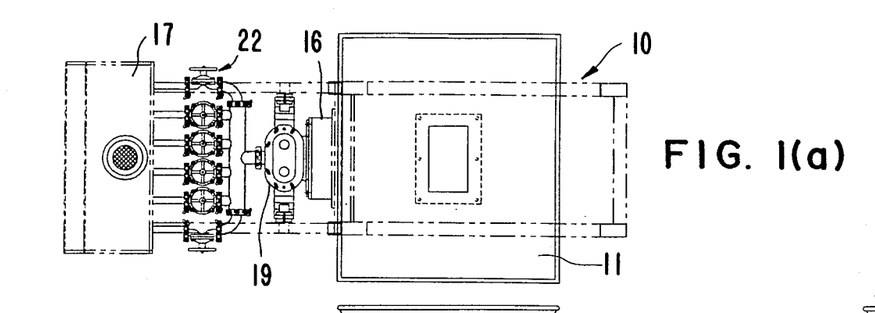
FIG. 1A is a plan view of the invention assembled with the auger feed.
Figure 1B:
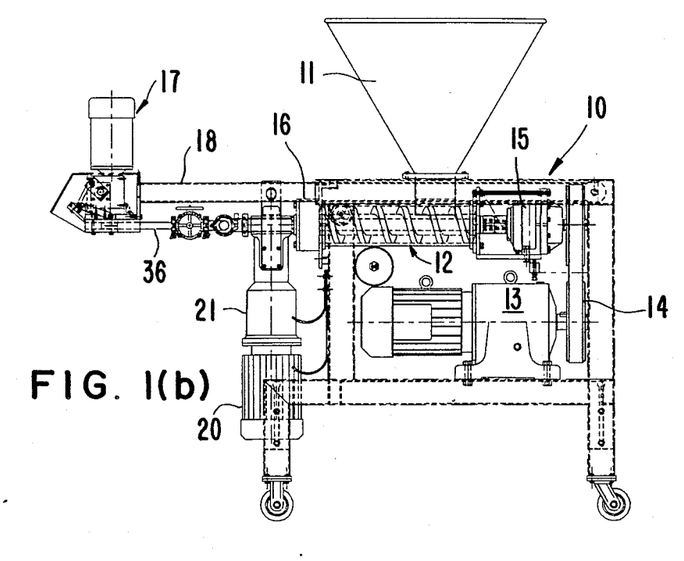
FIG. 1B is a side view of FIG. 1A.
Figure 1C:
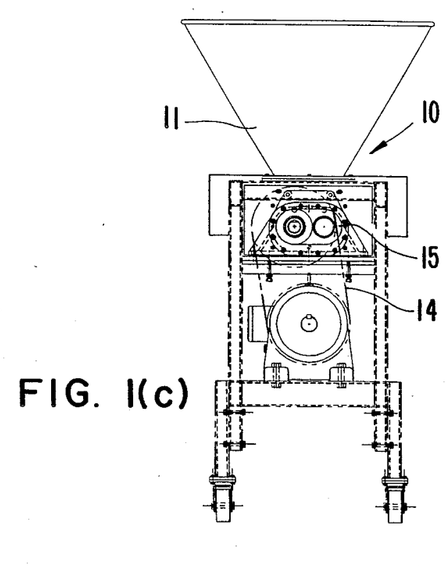
FIG. 1C is the end view from the right side of FIG. 1B.

Referring now and more detail to the drawings, there is shown in FIGS. 1A, 1B and 1C, the dough dividing apparatus 10 having a hopper 11 and an auger inside a trough and tunnel 12. The trough is the portion under the hopper outlet and the tunnel is the portion to the left of the trough. Although the drawings show approximately four threads of the flight of the auger in the tunnel, it is preferable to use only slightly more than two threads. The auger is a double juxtaposed pair of augers which are driven by a main drive 13 through a belt drive 14 and drive gear box 15.

The dough is continuously extruded to the left through a transition block 16 to a cut-off knife assembly 17. The apparatus has a support frame 18. The dough is homogenized to a uniform texture and density by the augers in the tunnel prior to the continuous exit of the dough through the transition block 16 to the metering pump 19 which has an outlet conduit. The metering pump is driven by a motor 20 to a gear box 21. The apparatus and method for handling the dough to provide this continuous stream of dough having a uniform texture and density is more fully described in the above-identified patent application filed simultaneously herewith.

Figure 2:
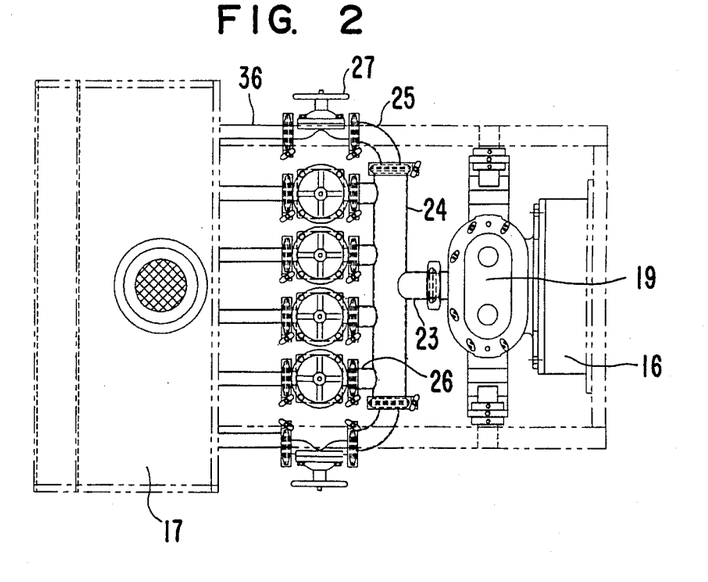
FIG. 2 is an enlarged plan view of the left portion of FIG. 1A.

With reference to FIGS. 1A, 1B and 2, the continuous stream of dough being transmitted through the outlet conduit of the metering pump 19 is fed into a manifold assembly 22 which divides the dough into six continuous streams of dough. Usually, this is four, six or eight streams and of course, can be a fewer or a larger number of multiple streams. The manifold assembly 22 has an inlet 23, a header 24, and end divider curved conduits 25 at each end. Exiting from the manifold 24 are also four straight intermediate divider conduits 26. Each of the six divided streams has a valve assembly 27 which is preferably the weir type of diaphragm valve having a TFE coated diaphragm as mentioned above. Exiting from each of the valves is an extruder conduit 36 which exits into the cut-off knife assembly 17 which will be described more fully, infra.

The revolution per minute of the augers 12 is typically 50 to 125 rpms. This is generally less than the speed of the augers when larger pieces of dough are being provided such as for loaves of bread as typically the invention herein is used for the smaller pieces of dough such as one to three ounces for rolls and buns. Of course, the size of the dough pieces and their ultimate use should not be taken as a limitation on the invention as both smaller and larger pieces can be handled.

The diameter of the inlet conduit to the manifold and the manifold header is 2 inches and the end divider curved conduits 25; straight immediate divider conduits 26 and the extruder conduits 36 are all 1½ inches in diameter. Preferably, the conduits are made of stainless steel.

Figures 3A, 3B:
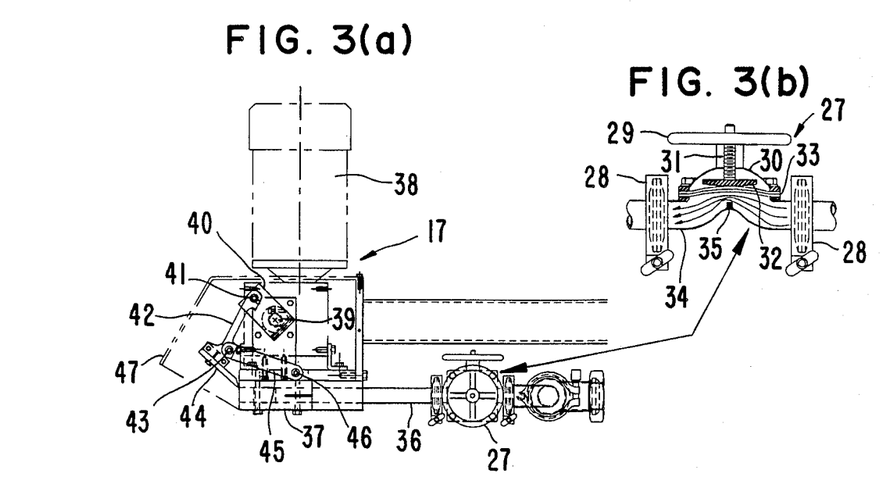
FIG. 3A is an enlarged side view of the left portion of FIG. 1B.
FIG. 3B is a schematic of the cross section of the valve shown in FIG. 3A.

With reference to FIG. 3B, there is shown a cross section of the preferred weir type of diaphragm valves assembly 27 which forms an adjustable restrictor to fine tune the rate of flow of the continuous streams of dough after they have been divided by the manifold assembly 22. The valve assembly 27 has two connector clamps 28 which are designed for quick connect and disconnect. The valve is operated by a hand wheel 29 which has three turns or 720° from full closure to full opening. This permits fine adjustments of the throttling action of the valves. The valve also includes a bonnet 30, a screw stem 31 and a diaphragm plate 32 designed to mate with the diaphragm seat or weir 35 when the valve is fully closed. The valve has a diaphragm 33 which is coated on the inside with TFE. Other types of valving may be used to provide the throttling action provided they can be finally adjusted but the weir type of diaphragm valve is the preferred one as it provides an easy passage for the dough through the valve with minimum turbulence, is readily sanitized and can be relatively easily adjusted.

If dough was absolutely constant, it could be theoretically divided into the multiple streams having equal velocities without the need for the valving just by designing the manifold assembly with the special characteristics needed. However, this does not work out as dough such as used in the production of buns and rolls is compressible pursuant to the action of yeast. The many various forms and consistencies of dough used in the production of buns and rolls relative to absorption and ingredients that serve to give the product unique flavors and textures, etc., along with the variable velocities required for differently weighted dough pieces, make the design of a perfect manifold impractical.

Dough, being a flowable paste material, does not occupy a place on available viscosity charts. This further complicates the design of a manifold that would present the flow divider with uniform pressures and velocities to the cut-off assembly for separation into smaller volumes.

The principle separation of the dough into multiple streams is provided by the manifold assembly but it is essential that each of these streams also be fine tuned as to constant velocity of the dough by means of the throttling valves.

With reference to FIGS. 3A and 3B, each of the extruder conduits exit into an extruder plastic termination section or extruder block 37 located in the cut-off knife assembly 17. The extruder plastic termination section has an extruder nozzle with an outlet rim in a common plane on the face 58 of the plastic termination section as best seen in FIG. 6.

Figure 5:
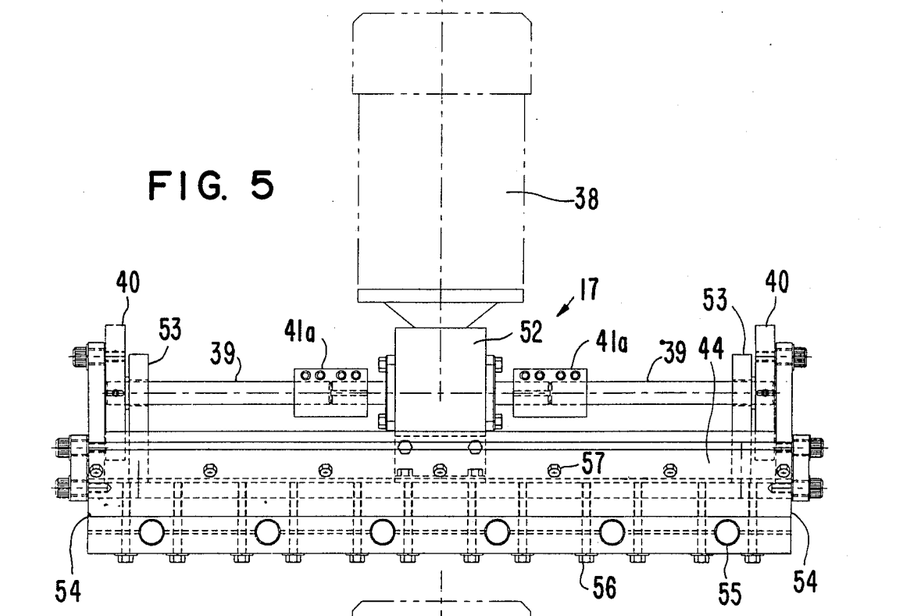
FIG. 5 is a front elevational view of the cutter and drive mechanism.
Figure 6:
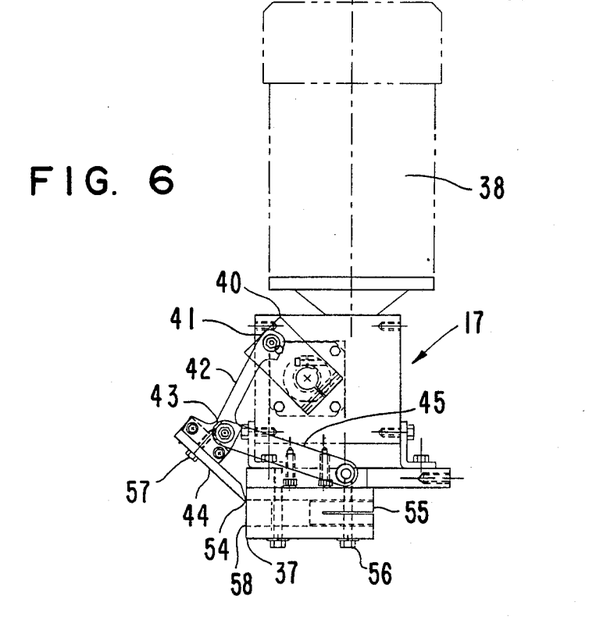
FIG. 6 is a side view of FIG. 5.

With reference to FIGS. 3A, 5 and 6, there is shown the cut-off knife assembly where a knife drive motor 38 drives a knife gear box 52 which has a double output shaft. Each output shaft is coupled by coupler 41A to the knife drive shaft 39. The knife drive shaft 39 rotates at a constant predetermined speed and drives knife drive link 40 keyed thereto. Drive link 40 has a drive link pivot 41 at the end remote from said shaft end. Carried by the drive link pivot 41 is a knife carrying or driven link 42. At the end of the driven link 42 is a second pivot 43 and beyond that pivot and adjacent thereto is mounted the cut-off knife 44 which is attached to the driven link 43 by bolts 57. The cut-off knife has a cutting edge 54.

A third link 45 is pivoted to the second pivot 43 at one end and to a fixed pivot 46 at the other end. The center of the shaft 39 and the third link fixed pivot 46 are fixedly located on the cut-off knife assembly so that the assembly itself provides a fixed link between these two pivot points so that it may be referred to as a four-bar link mechanism.

The cut-off knife assembly has a protective cover 47 which is shown in the down and safe position in FIG. 3A but is omitted for purposes of clarity in FIGS. 5 and 6. The outboard end of drive shaft 39 is supported by carrying bearings 53.

As best seen in FIG. 6, the extruder plastic termination section 37 is held to the cut-off blade assembly 17 by bolts 56. The plastic termination section has a face 58 lying in a common plane with the six extruder nozzles. As best seen in FIG. 5, the cut-off blade 44 is ⅜th inches thick, 4 inches high and 27 inches wide so that all six extrusions are cut-off simultaneously by the single blade. While the blade 44 and the plastic termination section 37 can be made of other materials, preferably they are made of ultra-high molecular density plastic or UHMD polyethylene. This does not require lubrication after long time runs and there is little or no dough build up.

Also shown in FIG. 6, is the tube and shoulder 55 of the termination of the extruder conduit 36.

The cut-off knife makes approximately 100 cuts per minute which can be readily varied up to 150 cuts per minute and reduced to fewer cuts per minute. At 150 cuts per minute, 900 dough pieces per minute are produced.

Figure 4A:
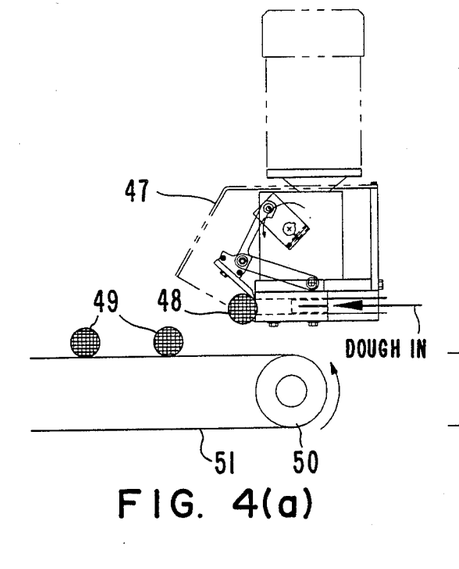
FIGS. 4A, 4B, 4C and 4D are schematics showing the progressive action of the cut-off knife.

With references to FIGS. 4A-4D, there is shown the sequence of cutting actions of the cut-off blade assembly. The shaft 39 rotates at a constant predetermined velocity in a counter-clockwise direction carrying with it the drive link, driven link and third link. The unique multiple functions of the four-bar link mechanism to which the cut-off knife is attached dictates its motion and path. FIG. 4A shows a straight line motion of the knife for about 55° of rotation of the driver link as it cuts off the extruded dough piece 48. Previously cut off dough pieces 49 are shown on the conveyor belt 51 which is supported in position by the conveyor roller 50. It should be noted that the freshly extruded dough piece 48 just prior to being cut-off is of a larger diameter than the conduit from which it is extruded. This relates to the characteristic flow of dough and the fact that the dough includes gases therein which were under pressure just prior to the extrusion. The knife velocity at the point shown in FIG. 4A is close to the velocity of the driver link where it joins the driven link.

Figure 4B:
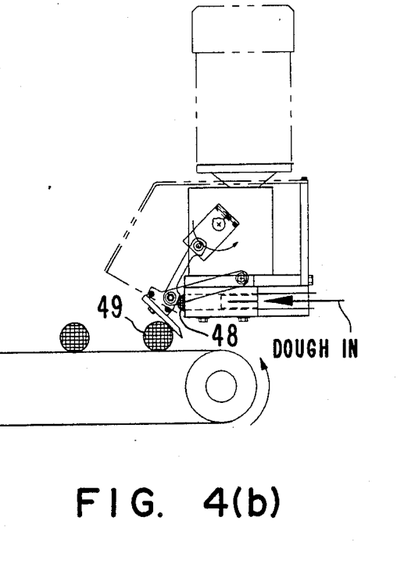

With reference to FIG. 4B, there is shown how the cut-off knife controls the movement of the product. As the dough pieces are cut-off and deposited on the conveyor belt, they are accelerated by the motion of the knife in the direction of the conveyor belt travel.

Figure 4C:
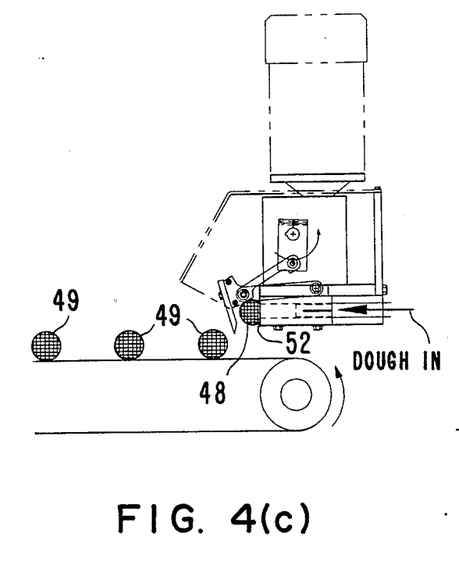

With reference to FIG. 4C, there is a velocity change as the knife first accelerates outward and upward, urging the current dough piece in the direction of the conveyor belt travel, then decelerates to the top of the knife's path completely clearing the extrusion port to make clearance for the subsequent dough piece being extruded. The increase in dwell across the top of the knife path allows for the extrusion of larger pieces of dough to be made without interfering with the knife at this stage of the cycle.

Figure 4D:
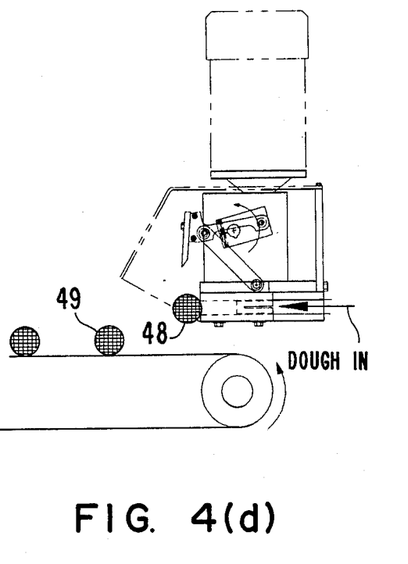

With reference to FIG. 4D, there is a further depiction of the path change as the knife starts downward, accelerating to the point of straight line motion as it engages the cutting plane of the dough piece just above the discharge port.

The uniform spacing of the dough pieces along the conveyor belt should be noted as previously such spacing was not normally attained. The present invention permits a much better control of the manufacturing process downstream from the apparatus.

There has thus been described a unique apparatus and method for simultaneously providing multiple dough pieces having a uniform texture and weight, free from lubricating oil and uniformly placed on a conveyor belt. There is also described a unique cutting arrangement and method and dough and the like divided and method.

It will be understood that the foregoing relates only to one preferred embodiment of the present invention. Numerous changes and modifications may be made therein without departing from the spirit and scope of the invention set forth in the following claims.

What is claimed is:

1. A method for dividing a mass of material similar to dough into pieces of uniform weight comprising the steps of:
    continuously moving a stream of said material of uniform density under pressure from said mass through an extruder nozzle having an outlet rim in a common plane;
    cutting said extruded material into pieces having a volume of uniform weight by a cutter that moves across said outlet rim in a straight line;
    moving said freshly cut pieces rapidly away from said outlet rim to a conveyor to permit the next piece of material to be cut-off without interference from either the piece previously cut-off or the cutter; and
    moving the cutter away from and across said outlet rim to a dwell position where it slows its movement to permit the next piece to be extruded before being cut-off.

2. The method of claim 1, wherein said material is dough.

3. The method of claim 2, wherein said continuously moving stream of dough is divided into a plurality of smaller streams of dough each having individual extruder nozzles and outlet rims in a common plane with all of said outlet rims being in the same plane and cutting said extruded dough and the like by said cutter that is a single cut-off knife that bridges all of said outlet rims to simultaneously cut identical pieces of dough.

4. A method of dividing a mass of material similar to dough simultaneously into a plurality of smaller volumes of uniform weight comprising:
    continuously moving a stream of said material of uniform density under pressure to a dispensing conduit;
    dividing said stream in said conduit into a plurality of equal smaller streams of material moving under pressure at the same approximate rate;
    restricting each of the divided smaller streams by an adjustable restrictor to fine tune the flow rates of each of said smaller streams to make all of them flow at the same rate;
    moving each of said smaller streams of material continuously under pressure to an extruder opening; and
    cutting each of said smaller streams simultaneously on a periodic basis as they extrude from said extruder openings.

5. The method of claim 4, wherein said material is dough.

6. The method of claim 5, wherein said adjustable restrictor is a weir type of diaphragm valves.

7. The method of claim 6, wherein the diaphragm of said valve has a surface of polytetrafluoroethylene adjacent said dough.

8. The method of claim 4, wherein said moving stream of dough is processed free of any lubricating oil so that the final product can be baked with uniform browning.

9. A method of dividing a mass of material similar to dough simultaneously into a plurality of smaller volumes of uniform weight comprising:
    continuously moving a stream of said material of uniform density under pressure from said mass to a dispensing conduit and through an extruder nozzle having an outlet rim in a common plane;
    dividing said stream in said conduit into a plurality of equal smaller streams of material each moving under pressure at the same approximate rate;
    restricting each of the divided smaller streams by an adjustable restrictor to fine tune the flow rates of each of said smaller streams to make all of them flow at the same rate;
    cutting each of said smaller streams simultaneously of said extruded material into pieces of uniform weight by a cutter that moves across said outlet rim in a straight line;
    moving said freshly cut pieces rapidly away from said outlet rim to a conveyor to permit the next piece of material to be cut-off without interference from either the piece previously cut-off or the cutter; and
    moving the cutter away from and across said outlet rim to a dwell position where it slows its movement to permit the next piece to be extruded before being cut-off.

10. The method of claim 9, wherein said material is dough.

* * * * *

REEXAMINATION CERTIFICATE (4056th)

United States Patent [19]
Cummins

[11] B1 4,948,611
[45] Certificate Issued Apr. 25, 2000

[54] METHOD FOR DIVIDING AND CUTTING DOUGH AND THE LIKE

[75] Inventor: Donald L. Cummins, Mechanicsville, Va.

[73] Assignee: Bakery Holdings LLC, Richmond, Va.

Reexamination Request:
No. 90/005,279, Mar. 3, 1999

Reexamination Certificate for:
Patent No.: 4,948,611
Issued: Aug. 14, 1990
Appl. No.: 07/367,618
Filed: Jun. 19, 1989

[51] Int. Cl.[7] .................................................... A21D 6/00
[52] U.S. Cl. ............................ 426/503; 426/516; 426/518
[58] Field of Search ..................................... 426/503, 516, 426/518; 425/202, 308, 311; 83/580, 604

[56] References Cited

U.S. PATENT DOCUMENTS 3,776,671   12/1973   Bruschke et al. .
4,395,427   7/1983   Fischer et al. .
4,747,767   5/1988   Schnell .

*Primary Examiner*—George C. Yeung

[57] ABSTRACT

An apparatus and method for dividing a mass of dough into a plurality of individual streams by means of a manifold and fine tuning the flow rate of the individual streams by weir type diaphragm valves so the streams have identical flow rates. Each of the individual streams of dough are simultaneously cut into identical dough pieces by a rotating driver by a four-bar link mechanism.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–8 is confirmed.

Claims 1–3 are cancelled.

Claims 9–10 are determined to be patentable as amended.

New claims 11–24 are added and determined to be patentable.

9. A method of dividing a mass of [material similar to] dough simultaneously into a plurality of smaller volumes of uniform weight comprising:
   continuously moving a stream of said [material] *dough* of uniform density under pressure from said mass *in a hopper and through a metering pump* to a dispensing conduit and through an extruder nozzle having an outlet rim in a common plane;
   *after said stream of dough has moved through said metering pump* dividing said stream in said conduit into a plurality of equal smaller streams of [material] *dough* each moving under pressure at the same approximate rate;
   restricting each of the divided smaller streams by an adjustable restrictor to fine tune the flow rates of each of said smaller streams to make all of them flow at the same rate;
   cutting each of said smaller streams simultaneously of said extruded [material] *dough* into pieces of uniform weight by a cutter that moves across said outlet rim in a straight line;
   moving said freshly cut pieces rapidly away from said outlet rim to a conveyor to permit the next pieces of [material] *dough* to be cut-off without interference from either the pieces previously cut-off or the cutter.

10. The method of claim [9] *4*, wherein said material is dough, *and the step of continuously moving a stream of said material of uniform density under pressure to a dispensing conduit comprises: feeding the material from a hopper to an auger pump and urging the material with the auger pump to a metering pump, and feeding the material from the metering pump to the plurality of equal smaller streams.*

*11. The method of dividing a mass of material as described in claim 4, wherein the step of restricting each of the divided smaller streams of material by an adjustable restrictor comprises moving the material through passages and reducing the breadths of the passages.*

*12. The method of dividing a mass of material as described in claim 4, wherein the step of restricting each of the divided smaller streams of material by an adjustable restrictor comprises: moving each of the streams of material through a restrictor having a seat and a surface opposing said seat, and moving said surface with respect to the seat to change the opening therebetween.*

*13. The method of dividing a mass of material as described in claim 4, wherein said material is dough, and further including the step of homogenizing the dough as the dough is moved to the dispensing conduit.*

*14. The method of dividing a mass of material as described in claim 4, and wherein the step of continuously moving a stream of said material of uniform density under pressure to a dispensing conduit comprises degassing the material as the material is moved to the dispensing conduit.*

*15. A method of dividing a mass of dough simultaneously into a plurality of smaller volumes of uniform weight comprising:*
   *continuously moving a stream of dough of uniform density from a hopper with an auger inside a trough and tunnel and through a metering pump under pressure to a dispensing conduit;*
   *after the dough in the stream of dough leaves the metering pump, dividing said stream of dough in said conduit in a manifold assembly into a plurality of equal smaller streams of dough moving under pressure at the same approximate rate;*
   *restricting each of the divided smaller streams of dough by an adjustable restrictor to fine tune the flow rates of each of said smaller streams to make all of them flow at the same rate;*
   *moving each of said smaller streams of dough continuously under pressure to an extruder opening;*
   *extruding the streams of dough through the extruder openings; and*
   *cutting each of said smaller streams of dough simultaneously on a periodic basis as each stream of dough extrudes from said extruder openings.*

*16. The method of claim 15, wherein the step of restricting each of the divided smaller streams of dough with an adjustable restrictor comprises throttling the smaller streams of dough with a valve in each smaller stream of dough.*

*17. The method of claim 16, wherein the dough is compressible.*

*18. The method of claim 15, wherein the step of continuously moving a stream of dough includes degassing the dough.*

*19. The method of claim 17, wherein the step of restricting each of the divided smaller streams of dough by an adjustable restrictor in each smaller stream comprises adjusting the restrictor with a threaded stem.*

*20. The method of claim 15, wherein the step of cutting each of said smaller streams simultaneously on a periodic basis includes accelerating the movement of the cut dough pieces toward a conveyor in the direction of travel of the conveyor.*

*21. A method of dividing a mass of dough simultaneously into a plurality of smaller volumes of uniform weight comprising:*
   *continuously moving a stream of dough of uniform density in sequence from a hopper with an auger pump to a metering pump, and from the metering pump under pressure to a dispensing conduit;*
   *after the dough in the stream of dough leaves the metering pump, dividing said stream of dough in a manifold assembly positioned in said conduit into a plurality of equal smaller streams of dough each moving under pressure at the same approximate rate;*
   *restricting each of the divided smaller streams of dough by an adjustable restrictor in each smaller stream to fine tune the flow rates of each of said smaller streams to make all of them flow at the same rate;* moving each of said smaller streams of dough continuously under pressure to an extruder opening; and cutting each of said smaller streams simultaneously on a periodic basis as they extrude from said extruder openings.

22. The method of claim 21, and further including the step of homogenizing the dough as the dough moves from the hopper toward the metering pump.

23. A method of dividing a mass of compressible dough simultaneously into a plurality of smaller volumes of compressible dough of uniform weight comprising:

continuously moving with an auger pump a stream of said dough of uniform density under pressure from a hopper to a metering pump, moving the stream of dough with the metering pump through a dispensing conduit;

as the stream of dough moves through the dispensing conduit, moving the stream of dough through a manifold;

dividing said stream of dough in said dispensing conduit as the dough moves through the manifold into a plurality of equal smaller streams of dough moving under pressure at the same approximate rate;

restricting each of the divided smaller streams of dough by an adjustable restrictor in each smaller stream of dough and adjusting the restrictors to fine tune the flow rates of each of said smaller streams to make all of said smaller streams of dough flow at the same rate;

moving each of said smaller streams of dough continuously under pressure to an extruder opening for each stream of dough;

extruding all of the smaller streams of dough through the extruder openings;

simultaneously cutting each of said smaller streams of dough from the extruder openings on a periodic basis as the smaller streams of dough extrude from said extruder openings.

24. The method of claim 23 and further including the step of: as the streams of dough are extruded through the extruder openings, increasing the sizes of the streams of dough being extruded through the extruder openings.

* * * * *